United States Patent [19]

Ishikawa et al.

[11] 3,828,439

[45] Aug. 13, 1974

[54] SIZING SYSTEM FOR MEASURING THE DIAMETER OF A ROTATING WORKPIECE OF NON-CIRCULAR CROSS-SECTION

[75] Inventors: Mineo Ishikawa; Kazuo Moriya, both of Kariya, Japan

[73] Assignee: Toyoda Koki Kabushiki Kaisha, Kariya-shi, Japan

[22] Filed: Aug. 21, 1972

[21] Appl. No.: 282,221

[52] U.S. Cl. ............ 33/143 L, 33/178 E, 51/165.8, 51/165.83, 318/636, 318/657
[51] Int. Cl. ............................................. G01b 7/12
[58] Field of Search ................... 51/165.83, 165.91; 33/143 L, 147 L, 147 N, 148 H, 149 J, 178 E, 172 F, 174 L; 318/636, 656, 657, 672

[56] References Cited
UNITED STATES PATENTS

| | | | |
|---|---|---|---|
| 2,547,719 | 4/1951 | Rosser | 33/178 E |
| 3,098,957 | 7/1963 | Thompson et al. | 318/636 |
| 3,508,444 | 4/1970 | Sitomer et al. | 318/636 |
| 3,621,614 | 11/1971 | Royotaro | 51/91 |
| 3,717,934 | 2/1973 | Ishikawa | 33/174 L |

*Primary Examiner*—Harry N. Haroian
*Assistant Examiner*—John W. Shepperd
*Attorney, Agent, or Firm*—Oblon, Fisher, Spivak, McClelland & Maier

[57] ABSTRACT

An in-process sizing device generates an output signal corresponding to the diameter of a rotating workpiece of non-circular cross-section. A signal generating circuit generates a first and a second signal each time the output signal is respectively increasing and decreasing in the cycle thereof. A peak holding circuit holds the voltage peak of the output signal in response to the first signal. A sample holding circuit picks up a voltage sample corresponding to a major diameter of the rotating workpiece from the voltage peak in response to the second signal and holds the same therein. Another circuit is connected to the sample holding circuit to generate a sizing signal when the voltage sample attains a voltage preset thereto in accordance with the desired particular diameter.

5 Claims, 3 Drawing Figures

SIZING SYSTEM FOR MEASURING THE DIAMETER OF A ROTATING WORKPIECE OF NON-CIRCULAR CROSS-SECTION

BACKGROUND OF THE INVENTION

The present invention relates generally to sizing systems for measuring the diameters of workpieces being ground by a grinding wheel, and more particularly to an improved in-process sizing system which is designed to measure a major diameter of a rotating workpiece of non-circular cross-section, such as one having an elliptical cross-section.

A rotating workpiece is generally ground to a final form of circular cross-section in the usual grinding operation, and the diameter of the workpiece is conventionally measured by a sizing device which has a pair of measuring feelers maintained in continuous engagement with the workpiece at positions on the workpiece being diametrically opposed to each other.

If, however, the workpiece, such as, for example, being a piston for combustion engines, is to be ground to a non-circular cross-section form, such as an ellipse having a major diameter and a minor diameter, the conventional sizing device generates an output signal having a wave form of two cycles per each revolution of the workpiece and a tendency to decrease. To measure the major diameters, the conventional sizing device has a switch and an actuating member, or a cam operable in coordination with the rotation of the workpiece, so as to actuate the switch when the measuring feelers contact the workpiece at positions corresponding to the major diameter. The voltage peak corresponding to the major diameter is picked up from the output signal when a synchronous signal is generated by the switch which comes into engagement with the cam.

However, it has been found to be very difficult to accurately accord the rotational phase of the cam to that of the workpiece, and further to timely pick up the voltage peak which instantaneously emerges.

SUMMARY OF THE INVENTION

It is, therefore, an object of the present invention to provide an improved in-process sizing system which is capable of measuring accurately a major single diameter of a workpiece being ground to a non-circular cross-section.

It is another object of the present invention to provide an improved in-process sizing system for timely picking up a voltage sample corresponding to a major diameter of a workpiece from an output signal in response to the periodic changes of voltage of the output signal.

Briefly, according to the present invention, these and other objects are achieved by providing an improved in-process sizing system for measuring a major diameter of a rotating workpiece of non-circular cross-section which comprises a detecting device for detecting the changes of diameter of the rotating workpiece to generate an output signal corresponding to the diameter of the rotating workpiece, and a circuit for generating a sizing signal when the voltage of the output signal attains a voltage preset thereto in accordance with a desired major diameter. Furthermore, a signal generating circuit is provided for generating a first and a second signal each time the output signal is respectively increasing and decreasing in the cycle thereof. A peak holding circuit holds the voltage peak of the output signal in response to the first signal, and a sample holding circuit picks up a voltage sample corresponding to the major diameter from the voltage peak in response to the second signal and holds the same therein. The voltage sample is applied to the first mentioned circuit.

BRIEF DESCRIPTION OF THE DRAWING

The foregoing and various other objects, features and attendant advantages of the present invention will be more fully appreciated as the same becomes better understood from the following detailed description of a preferred embodiment when considered in connection with the accompanying drawings, in which.

DESCRIPTION OF A PREFERRED EMBODIMENT

Figure 1:
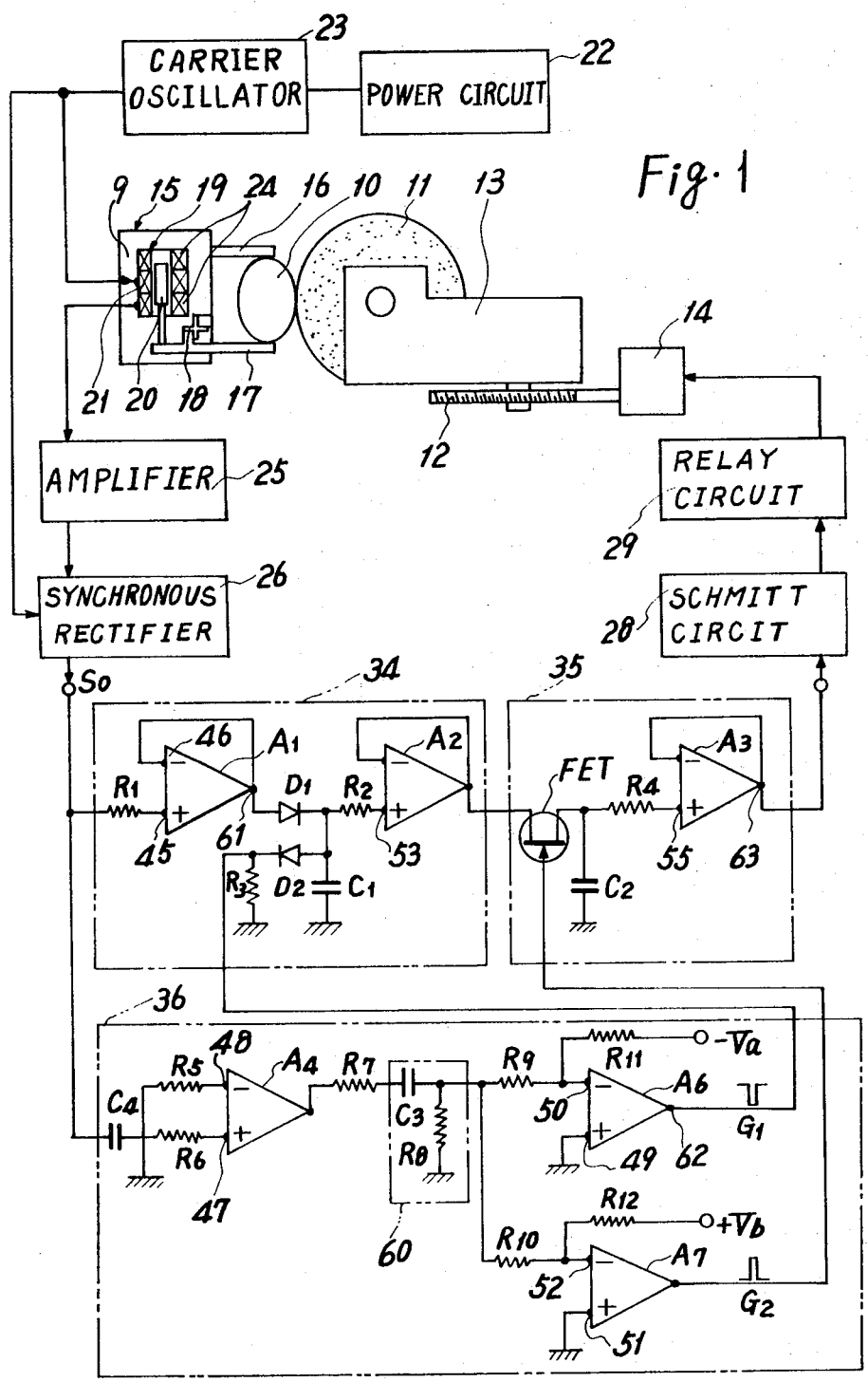
FIG. 1 is a schematic view and an electric circuit including parts in block diagram form which show an in-process sizing system according to the present invention.

Referring now to the drawings, and more particularly to FIG. 1, a workpiece 10 being of non-circular cross-section, such as, for example, having an elliptical cross-section, is shown being rotatably mounted between a headstock and a tailstock of a cam grinding machine. The workpiece 10 is not only rotatable about its own axis in accordance with the rotation of a master cam, but also may be swung about another axis disposed below its own axis along with the contour of the master cam so as to be reciprocably moved toward and away from a grinding wheel 11. The grinding wheel 11 is rotatably mounted on a wheel slide 13 which is drivingly connected to a feed screw 12. A feed power unit 14 rotates the feed screw 12 to feed the wheel slide 13 toward the workpiece 10. A further description of the cam grinding machine will not be given since such grinding machines are well known to those skilled in the art, however reference is made to U.S. Pat. No. 3,621,614, of Ryotaro Hikita et al., patented Nov. 23, 1971.

A detecting device generally indicated by the reference numeral 15 is mounted on a swing table so as to be swung as well as and together with the workpiece 10 against the grinding wheel 11. A detecting head 9 of the detecting device 15 supports a pair of measuring feelers 16 and 17 which are held in contacting engagement with the workpiece 10 during a grinding operation. The lower measuring feeler 17 is rotatably supported by a cross spring 18, which also serves to resiliently urge the feeler 17 upwardly. On the detecting head 9 is mounted a differential transformer generally indicated by the reference numeral 19 having a movable core 20 which is operably connected to the lower measuring feeler 17.

Figure 2:
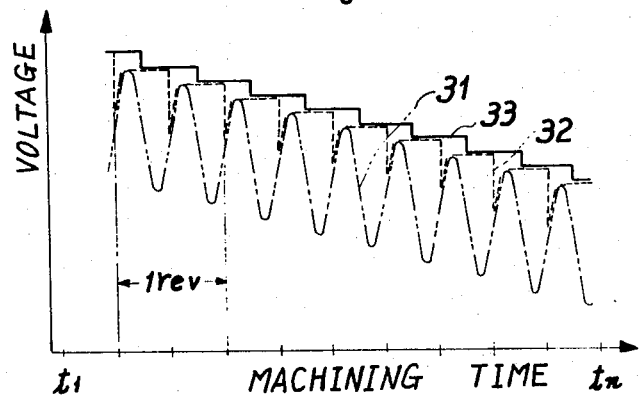
FIG. 2 is a graph showing wave forms of signal voltage at each point of a peak holding circuit and a sample holding circuit of FIG. 1.

A carrier oscillator 23 is connected to a power circuit 22 for generating a carrier current of pulse wave form, which is applied to a primary coil 21 of the differential transformer 19. The carrier current is modulated correspondingly to the relative displacement of measuring feelers 16 and 17 to generate an output signal, which appears at a secondary coil 24 to be applied to an amplifier 25, and in turn to a synchronous rectifier 26 connected to the carrier oscillator 23. The modulated output signal is demodulated and rectified by the synchronous rectifier 26 synchronously with the frequency of the carrier current, so that the characteristic curve of the output voltage is converted from a sinusoidal type curve to a linear curve as is well known. The output voltage converted by the synchronous rectifier 26 is applied to a peak holding circuit 34 and a signal generating circuit 36. Thus, an analog output voltage corresponding to the diameter of the workpiece 10 is transmitted from the differential transformer 19 to an input terminal So through the amplifier 25 and the synchronous rectifier 26. As shown by a phantom line 31 in FIG. 2, the output voltage is of a wave form having two cycles during each revolution of the workpiece 10, since the measuring feelers 16 and 17 are held in measuring engagement with the elliptical periphery of the workpiece 10 during a grinding operation. The output wave form of the output voltage generally shows a tendency to decrease with the process of the grinding operation.

The signal generating circuit 36 generates a first signal $G_1$ and a second signal $G_2$. The first signal $G_1$ is generated when the measuring feelers 16 and 17 are in contact with the elliptical workpiece 10 at the intermediate positions where the measured diameter of the workpiece 10 is shifting from a minor diameter portion to a major diameter portion during the rotation of the workpiece 10. On the other hand, the second signal $G_2$ is generated when the measuring feelers 16 and 17 are in contact with the workpiece 10 at the intermediate positions where the measured diameter is shifting from the major diameter portion to the minor diameter portion. The peak holding circuit 34 holds the voltage peak corresponding to the major diameter till the next first signal $G_1$ is applied thereto, as shown by a dotted line 32 in FIG. 2, and only the maximum voltage corresponding to the major diameter of the elliptical workpiece 10 is picked up by a sample holding circuit 35 from the voltage peak when the second signal $G_2$ is applied thereto, wherein it is held until the following second signal $G_2$ is applied thereto, as will be mentioned below in detail.

Figure 3:
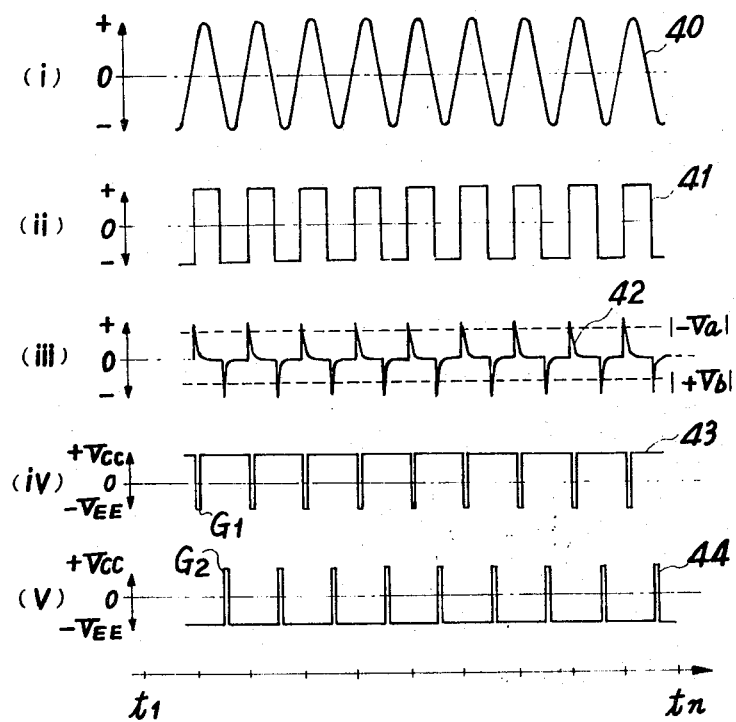
FIG. 3 is a series of graphs showing the relationship between different voltages at strategic points in a signal generating circuit of FIG. 1, wherein the machining time of the common axis of abscissa is identical with that of FIG. 2.

The output voltage which is transmitted from the synchronous rectifier 26 to the input terminal So is simultaneously applied to a condenser $C_4$ in the signal generating circuit 36 and to a non-inverting input terminal 45 of an operational amplifier $A_1$ of the peak holding circuit 34 through a resistance $R_1$. The operational amplifier $A_1$ is of the type wherein a pair of transistors or bipolar transistors are connected to the input terminals and are differentially operable to an input signal applied to the input terminals, as is well known to those skilled in the art. The condenser $C_4$ cuts out the DC voltage part causing the decreasing tendency in the input voltage shown by the wave form 31 of phantom line in FIG. 2 to thereby modify the input wave form 31 to a wave form 40 as shown in FIG. 3(i). The signal voltage of the modified wave form 40 is applied to a non-inverting input terminal 47 of an operational amplifier $A_4$ in the signal generating circuit through an input resistance $R_6$. The operational amplifier $A_4$ amplifies the signal voltage 40 by a large gain to thereby convert the wave form thereof to a rectangular wave form 41, as shown in FIG. 3(ii), since an inverting input terminal 48 of the operational amplifier $A_4$ is grounded through an input resistance $R_5$. The voltage of the rectangular voltage form 41 is applied to a differential circuit 60 through an input resistance $R_7$. The conventional differential circuit 60 comprises a condenser $C_3$ and a resistance $R_8$ which is connected to and between the condenser $C_3$ and ground, thus converting the rectangular wave form 41 to a wave form 42, as shown in FIG. 3(iii). The voltage of the differential wave form 42 is applied simultaneously to an inverting input terminal 50 of an operational amplifier $A_6$ through an input resistance $R_9$ and to an inverting input terminal 52 of an operational amplifier $A_7$ through an input resistance $R_{10}$. Non-inverting input terminals 49 and 51 of the operational amplifiers $A_6$ and $A_7$ are connected to ground. A negative reference voltage $-Va$ is applied to the inverting input terminal 50 of the operational amplifier $A_6$ through a resistance $R_{11}$. On the contrary, a positive reference voltage $+Vb$ is applied to the inverting input terminal 52 of the operational amplifier $A_7$ through a resistance $R_{12}$. The absolute value $|-Va|$ of the negative reference voltage $-Va$ is preliminarily set up a little smaller than the maximum value of the differential wave form 42, while the absolute value $|+Vb|$ of the reference voltage $+Vb$ is preliminarily set up a little smaller than that of the minimum value of the differential wave form 42. Therefore, a negative pulse signal 43 saturated at $-V_{EE}$ voltage, as shown in FIG. 3(iv), is transmitted from the output terminal 62 of the operational amplifier $A_6$ each time the positive peak of the differential wave form 42 is generated by the differential circuit 60 or the sum of the voltage of the differential wave form 42 and the reference voltage $-Va$ becomes more than the voltage preset to the non-inverting input terminal 40. On the contrary, a positive pulse signal 44 saturated at $+Vcc$, as shown in FIG. 3(v), is transmitted from the operational amplifier $A_7$ each time the negative peak of the differential wave form 42 is generated by the differential circuit 60 or the sum of the voltage of the wave form 42 and the reference voltage $+Vb$ becomes less than the voltage preset to the non-inverting input terminal 51. The negative and the positive pulse signals 43 and 44 are respectively applied to the peak holding circuit 34 as the first signal $G_1$ and to the sample holding circuit 35 as the second signal $G_2$.

The output terminal 61 of the operational amplifier $A_1$ is directly connected to the inverting input terminal 46 thereof without any resistance so that the input signal applied to the non-inverting input terminal 45 may be transmitted to a diode $D_1$ without being amplified by the amplifier $A_1$. As is well known, operational amplifiers have a very high input impedance therein, thus being operable as a buffer amplifier to prevent its output from interfering with its input. The diode $D_1$ is connected to the operational amplifier $A_1$ so as to memorize the voltage peak of the output signal in cooperation with a condenser $C_1$ which is connected to and between the diode $D_1$ and ground. An operational amplifier $A_2$ also being operable as a buffer amplifier is connected to the diode $D_1$ and the condenser $C_1$ through a resistance $R_2$. The condenser $C_1$ is charged by the signal voltage which is transmitted from the operational amplifier $A_1$. The voltage peak memorized by the condenser $C_1$ is applied to the non-inverting input terminal 53 of the amplifier $A_2$ through the resistance $R_2$. A diode $D_2$ is connected to ground through a resistance $R_3$ and further to and between the condenser $C_1$ and the diode $D_1$. The output terminal 62 of the amplifier $A_6$ is connected to the diode $D_2$ and the resistance $R_3$ so as to discharge the condenser $C_1$ each time the negative pulse signal $G_1$ is transmitted from the amplifier $A_6$ to the diode $D_2$. Therefore, the wave form of the signal voltage applied to the non-inverting input terminal 53 may be shown by the dotted line 32 of FIG. 2, wherein the voltage peak of the output signal 31 is memorized until the following negative pulse signal, or the first signal $G_1$, is applied to the diode $D_2$.

A field-effect transistor FET of the junction type is connected to the output terminal of the operational amplifier $A_2$ at its source and is connected to the output terminal of the operational amplifier $A_7$ at its gate. The drain of the field-effect transistor FET is connected to ground through a condenser $C_2$, and further is electrically connected to the source when the positive pulse signal, or the second signal $G_2$, is applied to the gate. An operational amplifier $A_3$, operable as a buffer amplifier, is connected to the condenser $C_2$ and the drain at its noninverting input terminal 55 through a resistance $R_4$.

As mentioned above, the voltage sample which is picked up from the voltage peak in response to the second signal $G_2$ is transmitted from the peak holding circuit 34 to the sample holding circuit 35 through the trnasistor FET to be memorized by the condenser $C_2$ till the condenser $C_2$ is charged by the following voltage sample according to the application of the following second signal $G_2$ to the gate. Thus, a stepped output signal appears at the output terminal 63 of the operational amplifier $A_3$, as shown by the real line 33 in FIG. 2. The stepped wave form 33 shows only the changes of the voltage sample corresponding to the major diameter of the elliptical workpiece 10.

The voltage sample shown by the stepped wave form 33 is applied to a conventional Schmitt trigger circuit 28 to be compared with a voltage preset in accordance with a desired major diameter. When the voltage sample attains the preset voltage level in the Schmitt trigger circuit 28, a sizing signal is generated and transmitted to a relay circuit 29 for controlling the feed power unit 14, by which the retraction of the wheel slide 13 is commanded, thus accomplishing the grinding operation of the elliptical workpiece 10.

Obviously, many modifications and variations of the present invention are possible in light of the above teachings. It is to be understood therefore that within the scope of the appended claims, the invention may be practiced otherwise than as specifically described herein.

What is claimed as new and desired to be secured by Letters Patent of the United States is:

1. An in-process sizing system for measuring a particular major diameter of a rotating workpiece of non-circular cross-section, comprising:
    a detecting device for detecting the changes of diameter of said rotating workpiece to generate an output signal corresponding to the diameter of said rotating workpiece;
    a signal generating circuit for generating a first signal and a second signal each time said output signal is respectively increasing and decreasing in response to the change of diameter due to the non-circular cross-section of said rotating workpiece;
    a peak holding circuit for holding the voltage peak of said output signal in response to said first signal;
    a sample holding circuit for picking up a voltage sample corresponding to said major diameter from said voltage peak in response to said second signal and for holding the same therein; and
    circuit means connected to said sample holding circuit for generating a sizing signal when said voltage sample attains a preselected voltage in accordance with a desired major diameter.

2. An in-process sizing system according to claim 1, wherein said detecting device comprises:
    a pair of measuring feelers held in contacting engagement with said rotating workpiece of non-circular cross-section during a grinding operation;
    a differential transformer connected to said measuring feelers, said differential transformer having a primary coil and a secondary coil therein;
    a carrier oscillator for supplying a carrier current to said primary coil, said differential transformer modulating said carrier current in response to the relative displacement of said measuring feelers to generate said output signal;
    an amplifier connected to said secondary coil for amplifying said output signal; and
    a synchronous rectifier connected to said amplifier for demodulating and rectifying said output signal synchronously with the frequency of said carrier current.

3. An in-process sizing system according to claim 1, wherein said generating circuit comprises:
    a condenser connected to said detecting device for cutting out the DC voltage part of said output signal;
    a first operational amplifier connected to said condenser;
    a differential circuit connected to said first operational amplifier for generating a positive voltage peak and a negative voltage peak each time said output signal is respectively increasing and decreasing in the cycle thereof;
    a second operational amplifier connected to said peak holding circuit for supplying said first signal each time said positive voltage peak is generated; and
    a third operational amplifier connected to said sample holding circuit for supplying said second signal each time said negative voltage peak is generated.

4. An in-process sizing system according to claim 1, wherein said peak holding circuit comprises:
    an operational amplifier connected to the output terminal of said detecting device and operable as a buffer amplifier;
    a first diode connected to said operational amplifier;
    a condenser connected to said first diode so as to be charged by the voltage peak of said output signal; and
    a second diode connected to said condenser so as to discharge said condenser when said first signal is applied thereto.

5. An in-process sizing system according to claim 1, wherein said sample holding circuit comprises:

switching means connected to said peak holding circuit and to said signal generating circuit for picking up said voltage sample from said voltage peak in the cycle of said output signal when said second signal is applied thereto;

a condenser connected to said switching means for holding said voltage sample; and an operational amplifier connected to said condenser and said switching means so as to be operable as a buffer amplifier.

* * * * *